United States Patent
Ramesh

(10) Patent No.: US 9,191,314 B2
(45) Date of Patent: Nov. 17, 2015

(54) IN-BAND MANAGEMENT USING L2 ADDRESSES OVER B-VLAN IN AN SPBM NETWORK

(71) Applicant: Avaya Inc., Basking Ridge, NJ (US)

(72) Inventor: Deepak Ramesh, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 206 days.

(21) Appl. No.: 13/843,620

(22) Filed: Mar. 15, 2013

(65) Prior Publication Data

US 2014/0269719 A1    Sep. 18, 2014

(51) Int. Cl.
*H04L 12/28* (2006.01)
*H04J 3/16* (2006.01)
*H04L 12/741* (2013.01)
*H04L 12/46* (2006.01)
*H04L 12/64* (2006.01)

(52) U.S. Cl.
CPC ............ *H04L 45/74* (2013.01); *H04L 12/4641* (2013.01); *H04L 12/6418* (2013.01); *H04L 2212/00* (2013.01)

(58) Field of Classification Search
CPC ...................................................... H04L 45/74
USPC ........................................................ 370/392
See application file for complete search history.

(56) References Cited

U.S. PATENT DOCUMENTS

| 7,269,639 | B1 | 9/2007 | Lawrence | |
|---|---|---|---|---|
| 2010/0135291 | A1* | 6/2010 | Martin et al. | 370/389 |
| 2010/0208615 | A1* | 8/2010 | Soon et al. | 370/254 |
| 2011/0317703 | A1* | 12/2011 | Dunbar et al. | 370/392 |
| 2012/0063465 | A1* | 3/2012 | Keesara et al. | 370/401 |
| 2013/0077627 | A1* | 3/2013 | Appalla et al. | 370/390 |
| 2013/0100851 | A1* | 4/2013 | Bacthu et al. | 370/254 |
| 2013/0346628 | A1* | 12/2013 | Canion et al. | 709/245 |
| 2014/0086100 | A1* | 3/2014 | Keesara et al. | 370/255 |

FOREIGN PATENT DOCUMENTS

| EP | 1940085 A1 | 7/2008 |
|---|---|---|
| EP | 2104897 A2 | 7/2008 |
| GB | 2506472 A | 4/2014 |

OTHER PUBLICATIONS

Avaya, "Demystifying Shortest Path Bridging, 802.1aq", Didier Ducarre, 2012 Obtained from: http://www2.avaya.com/emea/campaigns/aetf/presentations/downloads/Demystifying%20SPB.pdf.
Combined Search and Examination Report mailed Sep. 4, 2014 in related Application No. GB1404380.6.

* cited by examiner

*Primary Examiner* — Gerald Smarth

(57) ABSTRACT

Methods, systems and computer readable media for in-band management using L2 addresses over a B-VLAN in an SPBm network.

12 Claims, 6 Drawing Sheets

100

100

IN-BAND MANAGEMENT USING L2 ADDRESSES OVER B-VLAN IN AN SPBM NETWORK

TECHNICAL FIELD

Embodiments relate generally to computer networks, and more particularly, to methods, systems and computer readable media for in-band management using L2 addresses over B-VLAN in an SPBm network.

BACKGROUND

Switches participating in SPBm networks are typically connected over B-VLANs using their respective L2 addresses. On a B-VLAN, it may not be possible to enable IP and give an IP address to the B-VLAN over which a user can perform in-band management. In-band management using L3 routed networks can have this capability. In a deployment of an SPBm network using only L2 connectivity over B-VLAN, there may not be in option to do in-band management over the B-VLAN using L2 addresses.

Embodiments were conceived in light of the above mentioned needs, problems and/or limitations, among other things.

SUMMARY

One or more embodiments can include a method for in-band management using L2 addresses over B-VLAN in an SPBm Network. The method can include configuring, at one or more processors, a VLAN mapped in an in-band management ISID, and adding, at the one or more processors, a port to the VLAN, wherein the port is coupled to a network management system. The method can also include allocating, at the one or more processors, a base VLAN MAC address based on a chassis MAC address, and sending, from the one or more processors, a gratuitous ARP message. In response to the ARP message, the management system can generate an ARP table based on responses to the gratuitous ARP message. The method can further include encapsulating, e.g., at a BEB, one or more packets from the management system using a Mac-in-Mac encapsulation on the in-band management ISID. The encapsulation can further include adding an encapsulation header having source and destination MAC addresses, BVLAN and management ISID.

The method can also include configuring an IP subnet associated with the network management system. The method can further include decapsulating a received pack associated with the in-band management ISID and forwarding the decapsulated packet to a processor associated with the receiving BEB.

Some implementations can include a system comprising one or more processors configured to perform operations. The operations can include configuring, at one or more processors, a VLAN mapped in an in-band management ISID and adding, at the one or more processors, a port to the VLAN, wherein the port is coupled to a network management system. The operations can also include allocating, at the one or more processors, a base VLAN MAC address based on a chassis MAC address, and sending, from the one or more processors, a gratuitous ARP message. The operations can further include encapsulating one or more packets from the management system using a Mac-in-Mac encapsulation on the in-band management ISID. The encapsulating can further include adding an encapsulation header having source and destination MAC addresses, BVLAN and management ISID.

The operations can further comprise configuring an IP subnet associated with the network management system. The operations can further comprise decapsulating a received pack associated with the in-band management ISID and forwarding the decapsulated packet to a processor associated with the receiving BEB.

Some implementations can include a nontransitory computer readable medium having stored thereon software instructions that, when executed by a processor, cause the processor to perform operations. The operations can include configuring, at one or more processors, a VLAN mapped in an in-band management ISID and adding, at the one or more processors, a port to the VLAN, wherein the port is coupled to a network management system. The operations can also include allocating, at the one or more processors, a base VLAN MAC address based on a chassis MAC address, and sending, from the one or more processors, a gratuitous ARP message. The operations can further include encapsulating one or more packets from the management system using a Mac-in-Mac encapsulation on the in-band management ISID. The encapsulating can further include adding an encapsulation header having source and destination MAC addresses.

The operations can further comprise configuring an IP subnet associated with the network management system. The operations can further comprise decapsulating a received pack associated with the in-band management ISID and forwarding the decapsulated packet to the management system.

DETAILED DESCRIPTION

In general, in an SPBm network topology, most discovery is conducted using Mac addresses (a Layer 2 address). However, for management purposes, another set of addresses typically needs to be generated, the IP addresses (or Layer 3 addresses). Some implementations permit in-band management of a network using L2 addresses (e.g., MAC addresses) without a need to create, manage or use L3 addresses (e.g., IP addresses).

A method can include mapping a host name to an L2 address (e.g., of 6 bytes), which is also known as a system-ID as defined and advertised by ISIS TLV. The L2 address is used for in-band management instead of the traditional IP address used for in-band management in networks with L3 connectivity. As part of the ISIS LSDB advertisements, ISIS host name and ISIS system-ID parameters are exchanged between all of the ISIS routers in an SPBm network.

As part of the shortest path first calculation, the shortest path to reach each of the ISIS routers is also calculated and kept in the ISIS table and programmed in the L2 FIB table.

This permits the shortest path to reach each of the ISIS routers via their respective system-ID or host name to be known over the B-VLAN using the L2 connectivity information. A user can make use of this L2 reachability information to do in-band management of all ISIS routers over B-VLAN.

Thus, users can do in-band management using L2 information, which can allow SPBm nodes to be managed via L2 information only without relying on IP reachability. This can provide flexibility to users in how the network is managed.

Figure 1:
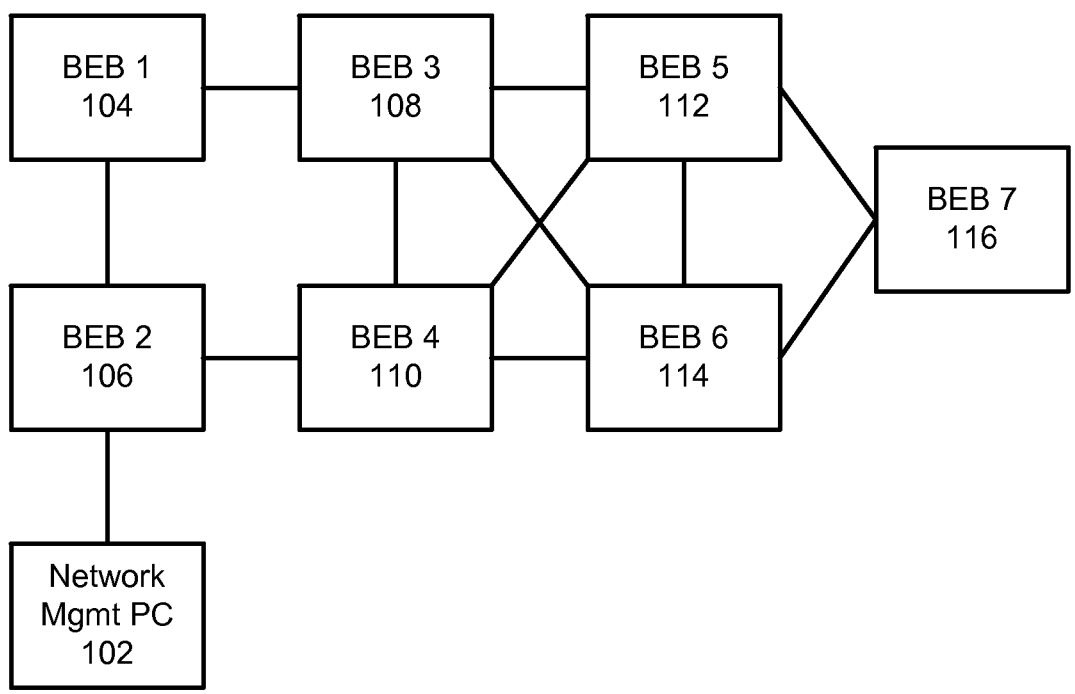
FIG. 1 is a diagram of a network in accordance with at least one embodiment.

FIG. 1 is a diagram of an example network 100 in accordance with at least one embodiment. The network includes a network management system 102 (e.g., a network management PC) and a plurality of interconnected BEBs (104-116). The network management system 102 and each of the BEBs can have configuration information. For example, the network management system 102 can have an IP address of 10.1.0.1 and be connected via an Ethernet port (e.g., eth0) to BEB 2 (106). BEB 2 (106) can have a MAC address of 00:00:00:00:00:02 and a nickname of 0.00.02.

Similarly, BEB 1 (104) can have a MAC address of 00:00:00:00:00:01 and a nickname of 0.00.01. BEB 3 (108) can have a MAC address of 00:00:00:00:00:06 and a nickname of 0.00.06. BEB 4 (1110) can have a MAC address of 00:00:00:00:00:07 and a nickname of 0.00.07. BEB 5 (1112) can have a MAC address of 00:00:00:00:00:03 and a nickname of 0.00.03. BEB 6 (114) can have a MAC address of 00:00:00:00:00:04 and a nickname of 0.00.04. BEB 7 (116) can have a MAC address of 00:00:00:00:00:05 and a nickname of 0.00.05.

Figure 2:
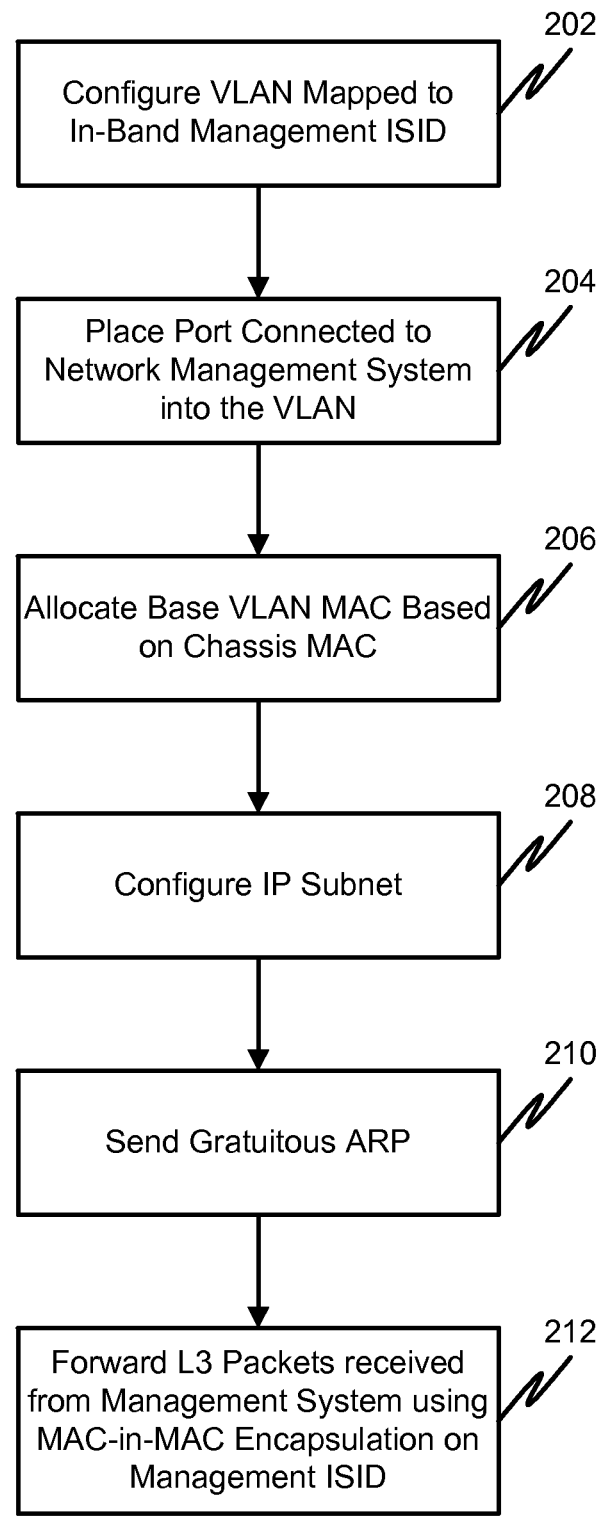
FIG. 2 is a flow chart of an example method for in-band management using L2 addresses over B-VLAN in an SPBm Network in accordance with at least one embodiment.

FIG. 2 is a flow chart of an example method for in-band management using L2 addresses over B-VLAN in an SPBm Network in accordance with at least one embodiment. Processing begins at 202, where a VLAN is configured and mapped to an in-band management ISID (e.g., at BEB 2). Processing continues to 204.

At 204, a port connected to a network management system (e.g., the port connecting the network management system 102 to BEB 2) is placed into the VLAN created in 202. Processing continues to 206.

At 206, a base VLAN MAC is allocated based on the chassis MAC (e.g., the MAC of BEB 2). Processing continues to 208.

At 208, a user can optionally configure an IP subnet because the VLAN is dedicated as a management ISID. Processing continues to 210.

At 210, a gratuitous ARP message is sent. The ARP message can be for an IP address in the format of "10.<nickname>" corresponding to each of BEBs in a network (e.g., 100). The source MAC in the gratuitous ARP message can be the VLAN's base MAC+nickname corresponding to each BEB.

An ARP table on a management system (e.g., 102) would be similar to the table below if the user configures 10.0.0.0/8 as the management subnet and the base MAC of the VLAN associated with the management ISID is 00:12:34:00:00:00.

| Internet Address | Physical Address | Outgoing Interface |
|---|---|---|
| 10.0.0.6 | 00:12:34:00:00:06 | eth0 |
| 10.0.0.1 | 00:12:34:00:00:01 | eth0 |
| 10.0.0.5 | 00:12:34:00:00:05 | eth0 |
| 10.0.0.4 | 00:12:34:00:00:04 | eth0 |
| 10.0.0.3 | 00:12:34:00:00:03 | eth0 |
| 10.0.0.2 | 00:12:34:00:00:02 | eth0 |
| 10.0.0.7 | 00:12:34:00:00:07 | eth0 |

Processing continues to 212.

At 212, when the management system sends packets (e.g., L3 packets) to the seed BEB, the seed BEB (e.g., BEB-2) can perform Mac-in-Mac encapsulation on the management ISID (described in greater detail below in connection with FIG. 3).

Figure 3:
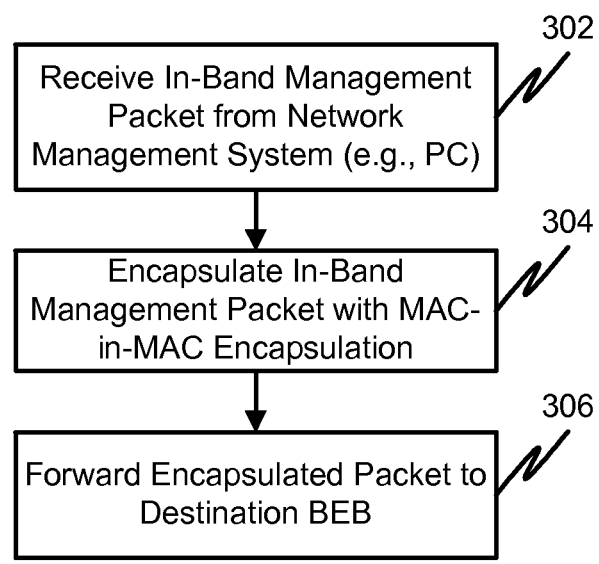
FIG. 3 is a flow chart of an example in-band management method for a sending BEB in accordance with at least one embodiment.

FIG. 3 is a flow chart of an example in-band management method for a sending BEB in accordance with at least one embodiment. Processing begins at 302, where an in-band management packet is received at a BEB (e.g., BEB-2). Processing continues to 304.

At 304, the in-band management packet is encapsulated. For example, the BMAC DA can be set as the BMAC of the destination BEB and the BMAC SA can be the BMAC of the originator BEB. The BVLAN will be the primary BVLAN and the ISID can be set to the user-configured in-band management ISID. The CMAC DA and CMAC SA can be zeroed out. The IP addresses in the source IP and destination IP in the IP header can be set to 10.<source BEB nickname> and 10.<destination BEB nickname>, respectively. Processing continues to 306.

At 306, the encapsulated packet is forwarded to the destination BEB.

Figure 4:
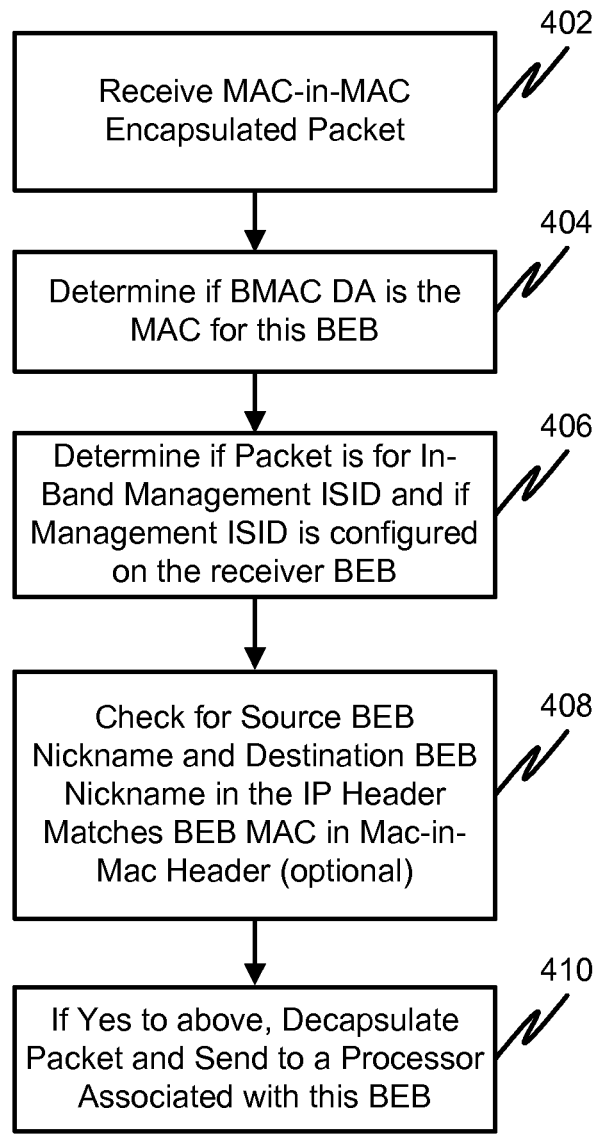
FIG. 4 is a flowchart of an example in-band management method for a receiving BEB in accordance with at least one embodiment.

FIG. 4 is a flowchart of an example in-band management method for a receiving BEB in accordance with at least one embodiment. Processing begins at 402, where a Mac-in-Mac encapsulated packet is received. Processing continues to 404.

At 404, the receiving system determines if the BMAC destination address (DA) contains the MAC address for the receiving system. Processing continues to 406.

At 406, the receiving system determines whether the received packet is for the in-band management ISID and whether the management ISID is configured on the receiving system. when both are true, processing continues to 408.

At 408, optionally, as an added security measure, the system can check that the source BEB nickname and destination BEB nickname in the IP header of the packet matches the source BEB MAC and the destination BEB MAC in the Mac-in-Mac header. Processing continues to 410.

At 410, the packet is decapsulated and sent to a processor associated with the receiving BEB.

Figure 5:
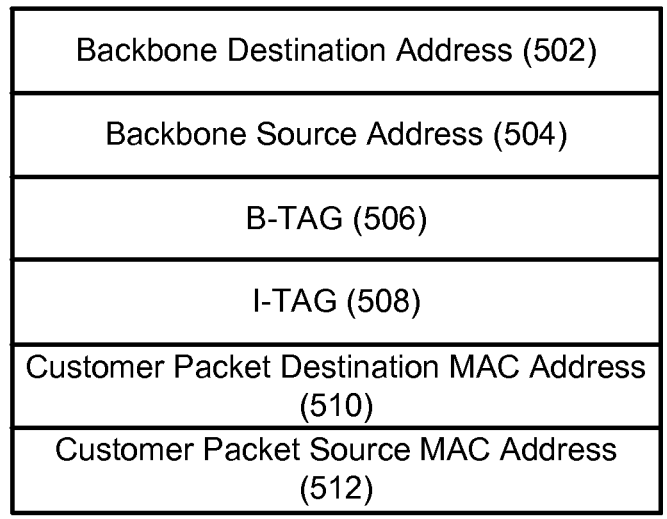
FIG. 5 is a diagram of an example packet in accordance with at least one embodiment.
Figure 5:
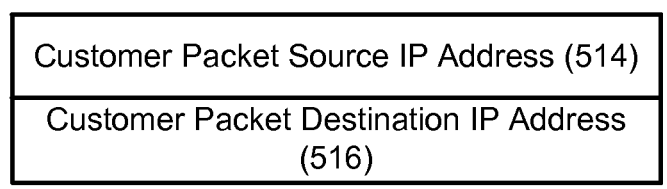

FIG. 5 is a diagram of an example packet in accordance with at least one embodiment. The example packet shown in FIG. 5 is for a packet originating from the network management PC (102) destined for BEB-5 (112) via BEB-2 (106). In particular, the packet includes a backbone destination address 502, which can be set to the MAC of BEB-5, and a backbone source address 504, which can be set to the MAC of BEB-2. The B-TAG 506 can be set to a BVID value (e.g., 10) and the I-TAG 508 can be set to the value corresponding to the management ISID (e.g., 100). The customer packet destination MAC address 510 can be set to the MAC of BEB-5 as seen on the management system 102 (e.g., 00:12:34:00:00:03). The customer packet source MAC address can be set to the MAC address of the management system 102 (e.g., 00:AB:CD:EF:00:00). The customer packet source IP address 514 can be set to the IP address of the management system (e.g., 10.1.0.1) and the customer packet destination IP address 516 can be set to the IP of BEB-5 as seen on the management system 102 (e.g., 10.0.0.3).

Figure 6:
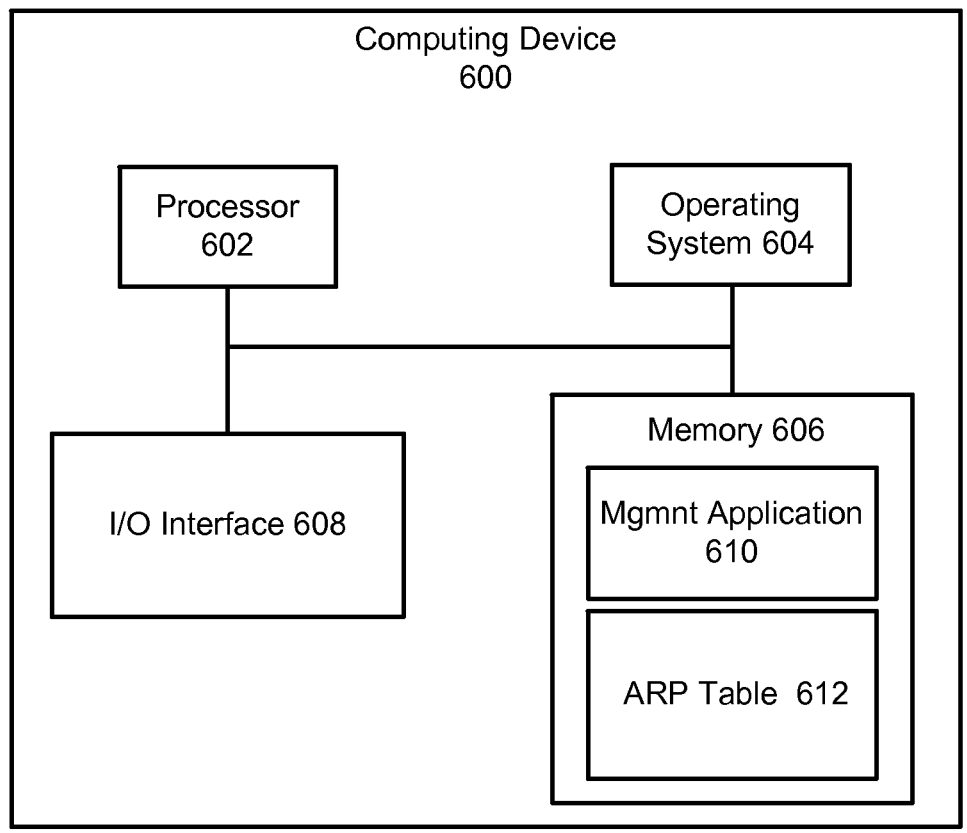
FIG. 6 is a diagram of an example computer in accordance with at least one embodiment.

FIG. 6 is a diagram of an example computer 600 in accordance with at least one embodiment. The computer 600 includes a processor 602, operating system 604, memory 606 and I/O interface 608. The memory 606 can include network management application 610 and a management database 612 (e.g., for storing an ARP table or the like).

In operation, the processor 602 may execute the application 610 stored in the memory 606. The application 610 can include software instructions that, when executed by the processor, cause the processor to perform operations for network management in accordance with the present disclosure (e.g., performing one or more of steps 202-212, 302-306 or 402-410 described above).

The application program 612 can operate in conjunction with the database 612 and the operating system 604.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for in-band management using L2 addresses over B-VLAN in an SPBm Network.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:
1. A method comprising:
configuring, at one or more processors, a virtual local area network (VLAN) mapped to an in-band management I-component service identity (ISID);
adding, at the one or more processors, a port to the VLAN, wherein the port is coupled to a network management system;
allocating, at the one or more processors, a base VLAN media access control (MAC) address based on a chassis MAC address;
sending, from the one or more processors, a gratuitous Address Resolution Protocol (ARP) message; and
encapsulating one or more Layer 3 (L3) packets received from the management system using a MAC-in-MAC header on the in-band management ISID.
2. The method of claim 1, wherein the encapsulating further comprises:
adding an encapsulation header having source and destination MAC addresses, a Backbone Virtual Area Network (BVLAN) and a management ISID.
3. The method of claim 1, further comprising configuring an Internet Protocol (IP) subnet associated with the network management system.

4. The method of claim 1, further comprising decapsulating a received packet associated with the in-band management ISID and forwarding the decapsulated packet to a processor associated with a receiving Backbone Edge Bridge (BEB).

5. The computer readable medium of claim 1, wherein the operations further comprise decapsulating a received packet associated with the in-band management ISID and forwarding the decapsulated packet to a processor associated with a receiving Backbone Edge Bridge (BEB).

6. A system comprising one or more processors configured to perform operations including:
configuring, at one or more processors, a virtual local area network (VLAN) mapped to an in-band management I-component Service Identity (ISID);
adding, at the one or more processors, a port to the VLAN, wherein the port is coupled to a network management system;
allocating, at the one or more processors, a base VLAN media access control (MAC) address based on a chassis MAC address;
sending, from the one or more processors, a gratuitous Address Resolution Protocol (ARP) message; and
encapsulating one or more packets received from the management system using a MAC-in-MAC header on the in-band management ISID.

7. The system of claim 6, wherein the encapsulating further comprises:
adding an encapsulation header having source and destination MAC addresses, a Backbone Virtual Area Network (BVLAN) and a management ISID.

8. The system of claim 6, wherein the operations further comprise configuring an Internet Protocol (IP) subnet associated with the network management system.

9. The system of claim 6, wherein the operations further comprise decapsulating a received packet associated with the in-band management ISID and forwarding the decapsulated packet to a processor associated with a receiving Backbone Edge Bridge (BEB).

10. A nontransitory computer readable medium having stored thereon software instructions that, when executed by a processor, cause the processor to perform operations including:
configuring, at one or more processors, a virtual local area network (VLAN) mapped to an in-band management I-component Service Identity (ISID);
adding, at the one or more processors, a port to the VLAN, wherein the port is coupled to a network management system;
allocating, at the one or more processors, a base VLAN media access control (MAC) address based on a chassis MAC address;
sending, from the one or more processors, a gratuitous Address Resolution Protocol (ARP) message; and
encapsulating one or more packets received from the management system using a MAC-in-MAC header on the in-band management ISID.

11. The computer readable medium of claim 10, wherein the encapsulating further comprises:
adding an encapsulation header having source and destination MAC addresses, a Backbone Virtual Area Network (BVLAN) and a management ISID.

12. The computer readable medium of claim 10, wherein the operations further comprise configuring an Internet Protocol (IP) subnet associated with the network management system.

* * * * *